United States Patent [19]

Gott et al.

[11] 4,398,296

[45] Aug. 9, 1983

[54] COMMUNICATION SYSTEMS

[76] Inventors: Geoffrey F. Gott, 10 Churchill Crescent, Marple, Cheshire; Paul Doany, Flat 7, 8 Conyngham Rd., Manchester, both of England; Majid Sepehri, Slotsherrensvej 71A, 2720 Vanlose, Denmark

[21] Appl. No.: 240,481

[22] Filed: Mar. 4, 1981

[30] Foreign Application Priority Data

Mar. 8, 1980 [GB] United Kingdom ................. 8007929

[51] Int. Cl.³ .......................... H04K 1/10; H04B 1/10

[52] U.S. Cl. ........................................ 375/1; 375/102; 375/103; 455/303

[58] Field of Search ...................... 375/1, 99, 100, 102, 375/103; 455/62, 63, 67, 168, 296, 303, 305, 306, 307

[56] References Cited

U.S. PATENT DOCUMENTS 3,160,813 12/1964 Biggi et al. ............................ 455/62
3,443,228 5/1969 Brenner et al. ......................... 455/62
3,475,684 10/1969 Covill ..................................... 455/62
3,932,818 1/1976 Masak ................................. 328/167

FOREIGN PATENT DOCUMENTS 1287375 8/1972 United Kingdom .

*Primary Examiner*—Marc E. Bookbinder
*Attorney, Agent, or Firm*—Oblon, Fisher, Spivak, McClelland & Maier

[57] ABSTRACT

There is disclosed a communication system wherein the transmitter and receiver synchronously change frequency during transmission of information and wherein each frequency to be used before transmission of information on that frequency is examined and as a result of such examination the receiver is adjusted to attempt to reduce the detrimental effects of interfering signals.

4 Claims, 3 Drawing Figures

COMMUNICATION SYSTEMS

This invention relates to communication systems.

Communication systems of the kind (hereinafter termed of the kind referred to) employing a changing frequency wherein the transmitter changes frequency during the transmission of information, and the receiver synchronously changes frequency, so as to receive the stated information are known. Examples of such systems employing so-called frequency hopping techniques wherein a number of discrete and not necessarily contiguous frequency bands are used, are described by Davies and Cahn in AGARD Lecture Series No. 58 on "Spread Spectrum Communications", 1973, pages 4-1 to 5-111.

It is an object of the present invention to provide a communication system of the kind referred to which offers improved performance by reducing the effect of interfering signals.

According to the present invention, a communication system of the kind referred to is characterised in that the receiving appartus is arranged to examine each frequency band to be used before transmission of information on that frequency band, and as a result of this examination to effect adjustments to attempt to reduce the detrimental effects of interfering signals.

The receiver adjustment is made in a small time interval before the reception of information on each frequency band, and the receiver adjustment includes the selective rejection (or attenuation) of interfering signals.

The invention will be further apparent from the following description with reference to the several figures of the accompanying drawings which show, by way of example only and in diagrammatic form, the receiver of one form of communication system embodying the invention.

Figure 1:
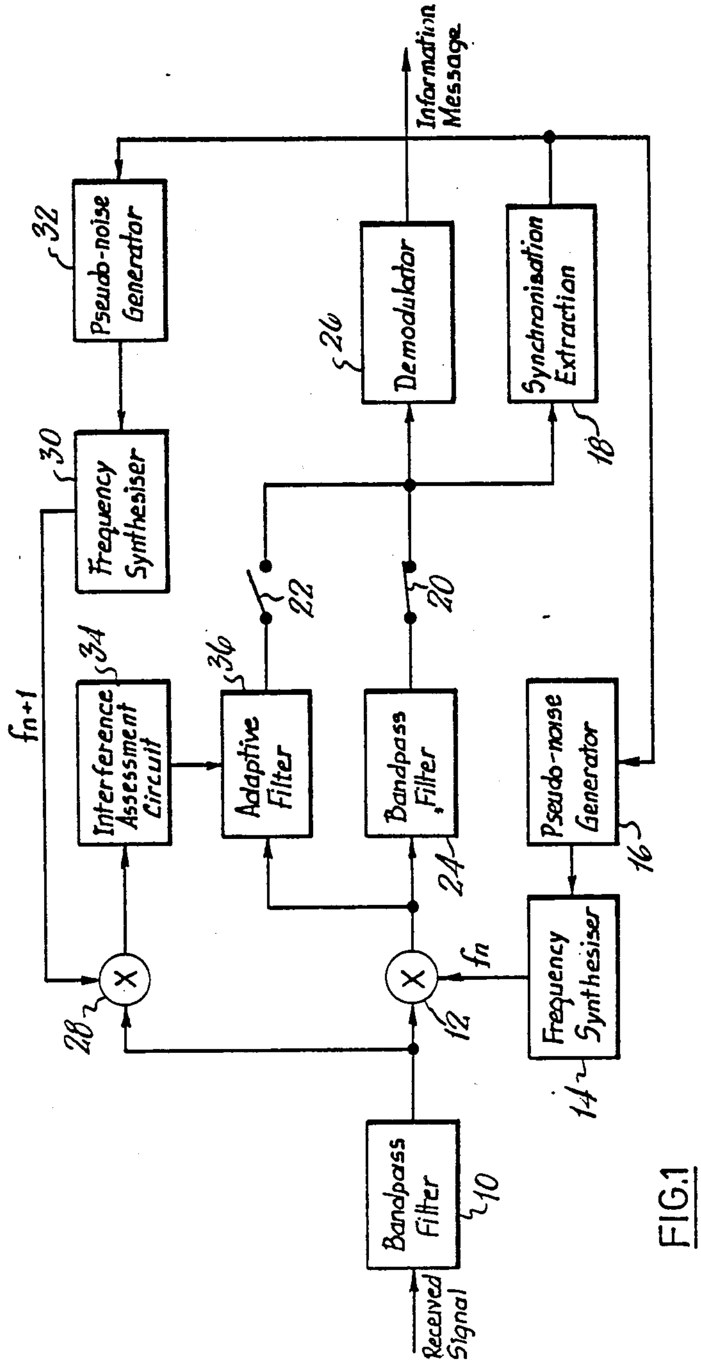
FIG. 1 shows a block circuit diagram of the receiver.
Figure 3:
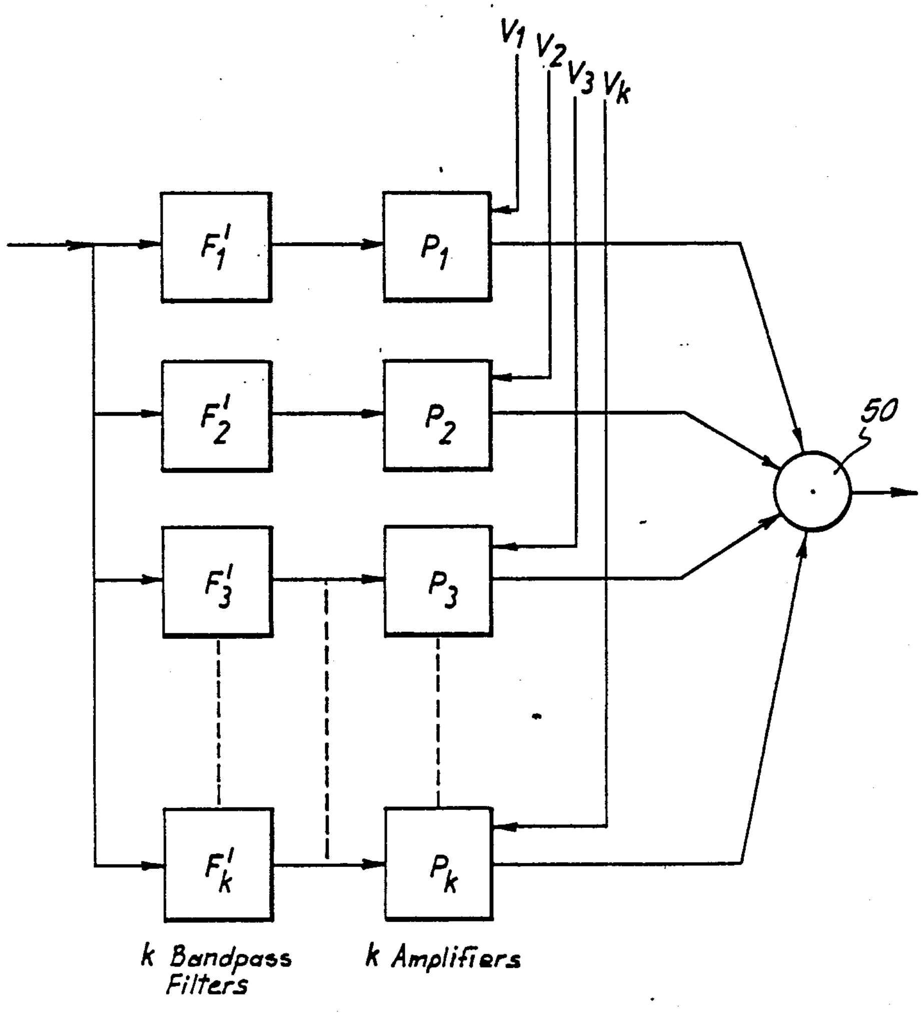

and FIG. 3 shows a block circuit diagram of the adaptive filter of the receiver of FIG. 1.

The receiver synchronously changed frequency so as to receive the transmitted information, as in the known frequency hopping systems described by Davies and Cahn.

The received signal is applied to a bandpass filter 10 and the bandpass filter output is applied to a multiplier 12, where it is multiplied by a signal of frequency $f_n$ which is derived from a frequency synthesiser 14. Frequency synthesiser 14 has its frequency controlled by a pseudo-noise generator 16, which is synchronised by a synchronisation extraction circuit 18. With switch 20 closed, and switch 22 open (as shown), the output of the multiplier 12 passes via a bandpass filter 24 to a demodulator circuit 26, which gives the information message output. As so far described, the operation is that of a frequency hopping receiver of the known form.

Whilst receiving information on a particular frequency band, the receiving apparatus also examines the signals on a frequency band (or bands) to be used for the reception of information. For example, whilst information is being received on one frequency band, the receiving apparatus may examine the frequency band to be used next for the reception of information. Thus, the output of the bandpass filter 10 is also applied to a multiplier 28 where it is multiplied by a signal of frequency $f_{n+1}$ which is derived from a frequency synthesiser 30. Frequency synthesiser 30 has its frequency controlled by a pseudo-noise generator 32, which is synchronised by the synchronisation extraction circuit 18. The output of the multiplier 28 is applied to an interference assessment circuit 34 which estimates the levels of interfering signals within the frequency band corresponding to the frequency $f_{n+1}$. This frequency band is the one to be used next for the reception of information, after the frequency band corresponding to frequency $f_n$. The output of the interference assessment cicuit 34 controls the response of an adaptive filter 36, which receives the output of the multiplier 12, at or during the time when the next frequency hop is achieved, that is, when the output of the frequency synthesiser 14 has frequency $f_{n+1}$, and the adaptive filter attempts to attenuate interfering signals. The output from the filter 36 is passed to the demodulator 26. This procedure continues for all frequency hops. When the receiver is operating in accordance with the invention, of course, the switch 20 is open, and the switch 22 is closed.

Figure 2:
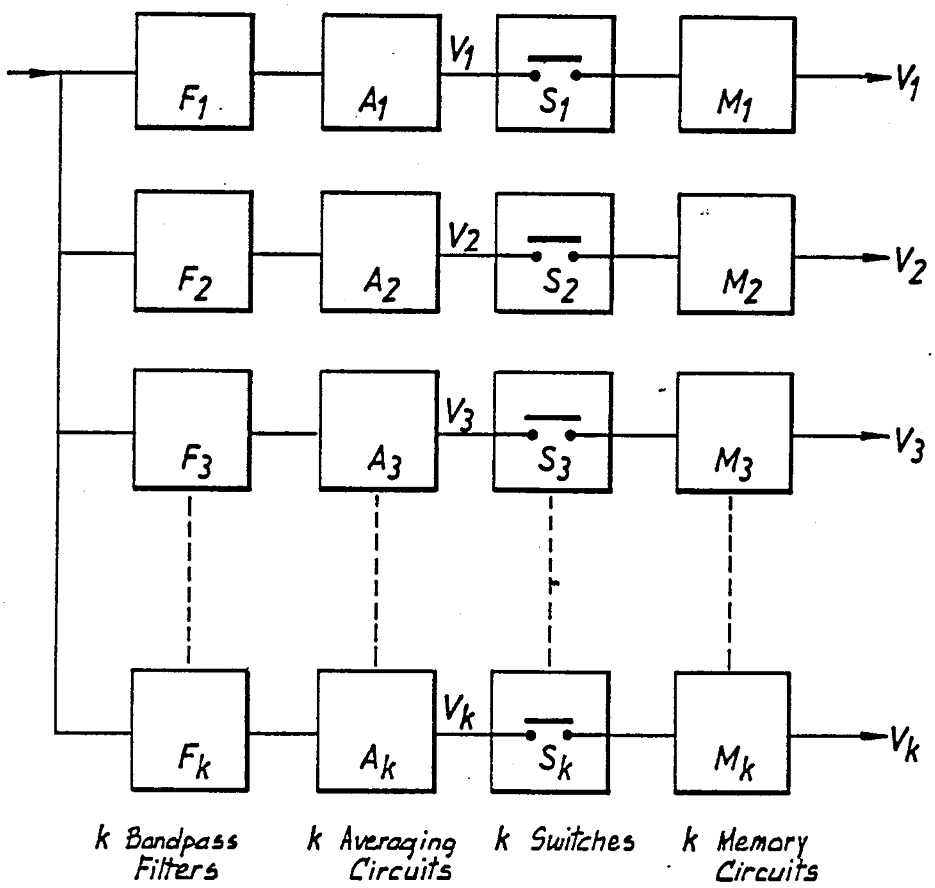
FIG. 2 shows a block circuit diagram of the interference assessment circuit of the receiver of FIG. 1.

The interference assessment circuit 34 is shown in more detail in FIG. 2. It includes k bandpass filters $F_1 \ldots F_k$ whose inputs are connected together. The total frequency band covered by these filters equals the frequency band covered by the information signal at each hop. The output signal from each bandpass filter is applied to an associated averaging circuit ($A_1 \ldots A_k$) which rectifies and then averages the filter output signal. Thus, for k bandpass filters, k voltages are obtained, $V_1$ to $V_k$, at the output of the k averaging circuits. Each of these voltages is applied to a memory circuit ($M_1 \ldots M_k$) by momentarily closing the switches ($S_1 \ldots S_k$), at the end of each interval of interference assessment. These stored voltages $V_1$ to $V_k$ form the output of the interference assessment circuit and are held for application to the adaptive filter 36 on the next frequency hop under the control of a suitable switching circuit (not shown).

The adaptive filter 36 is shown in more detail in FIG. 3. It comprises k bandpass filters ($F_1' \ldots F_k'$) corresponding with those used in the interference assessment circuit. The output of each filter is applied to an amplifier ($P_1 \ldots P_k$) whose gain is controlled by the appropriate voltage from the interference assessment circuit. Thus, the gain of amplifier $P_1$ is controlled by voltage $V_1$ and the gain of amplifier $P_2$ is controlled by voltage $V_2$ and so on. As described, the gain of each amplifier reduces as the control voltage increases. The outputs of all amplifiers are added in the adder 50 to give the output signals from the adaptive filter which is passed to the demodulator 26.

It will be appreciated that it is not intended to limit the invention to the above example only, many variations, such as might readily occur to one skilled in the art, being possible without departing from the scope thereof.

Thus, the invention may be applied to communication systems in which the transmitter and the receiver synchronously change frequency, but do not use the discrete hopping method as described by Davies and Cahn. For example, the transmitted signal may be swept in frequency, when the receiver must also synchronously sweep in frequency. At the same time, the receiving apparatus would examine interfering signals in those parts of the frequency sweep to be used, and make appropriate receiver adjustments when these frequencies are used for the transmission of information.

Again, the invention may be applied to a system where there is a sweep of frequency within each of a series of discrete hops.

We claim:

1. A receiver for a radio communications system in which first and second signals relating to message information are sequentially transmitted at different frequencies to said receiver, said receiver receiving and detecting said first and second signals in sequence and further including an interference assessment circuit for monitoring during reception and detection of said first signal at least one frequency band including said second signal and to estimate the levels of any interfering signals in said at least one band and an adaptive filter connected to said interference assessment circuit whereby said circuit controls the response of said filter, and wherein said adaptive filter receives said first and second signals in sequence and to attenuates interfering signals in a frequency band including the first signal in accordance with the interference signal levels estimated by said interference assessment circuit.

2. A receiver as in claim 1 wherein said interference assessment circuit includes a plurality 'p' of bandpass filters connected in parallel to receive said second signals, a plurality 'p' of averaging circuits, each of said averaging circuits connected to an associated one of said bandpass filters to rectify and average a voltage output therefrom, and means for applying the averaged voltage outputs from the averaging circuits to control the response of said adaptive filter.

3. A receiver as in claim 2 wherein said adaptive filter includes a plurality 'p' of bandpass filters, and a plurality 'p' of amplifiers each connected to receive the output of an associated one of said bandpass filters, wherein the gain of each of said amplifiers is controlled by an associated one of said averaged voltage outputs.

4. A receiver for a radio communications system in which signals related to message information are transmitted to said receiver and detected thereby, said signals exhibiting a frequency which successively varies in a predetermined frequency order from one predetermined frequency to a next predetermined frequency, said receiver comprising:

interference assessment means for monitoring at least one frequency band including at least said next predetermined frequency during reception and detection of said one predetermined frequency, and for generating estimation signals corresponding to any interfering signals monitored within said monitored frequency band; and, adaptive filter means coupled to said interference assessment circuit and having a filter response controlled by said estimation signals for attenuating the interfering signals in a frequency band including the one predetermined frequency in accordance with said estimation signals.

* * * * *